United States Patent [19]

Henshaw et al.

[11] Patent Number: 5,796,383
[45] Date of Patent: Aug. 18, 1998

[54] METHOD AND SYSTEM FOR PRESENTING CONTENTS OF A CONTAINER OBJECT WITHIN A GRAPHICAL USER INTERFACE IN A DATA PROCESSING SYSTEM

[75] Inventors: Susan F. Henshaw; Sarah D. Redpath, both of Cary, N.C.

[73] Assignee: International Business Machines Corp., Armonk, N.Y.

[21] Appl. No.: 654,350

[22] Filed: Aug. 7, 1995

Related U.S. Application Data

[63] Continuation of Ser. No. 113,557, Aug. 27, 1993, abandoned.
[51] Int. Cl.$^6$ .................................................. G09G 5/00
[52] U.S. Cl. .................................. 345/112; 345/340
[58] Field of Search .......................... 345/112, 113, 345/114, 115, 118, 121, 123, 339, 340, 341, 342, 343, 344, 348, 350, 351, 352, 353, 354

[56] References Cited

U.S. PATENT DOCUMENTS

| | | | |
|---|---|---|---|
| 4,712,191 | 12/1987 | Penna | 345/119 |
| 4,975,690 | 12/1990 | Torres | 345/119 |
| 5,283,560 | 2/1994 | Bartlett | 345/146 |

FOREIGN PATENT DOCUMENTS

A0520924  12/1994  European Pat. Off. .

OTHER PUBLICATIONS

*IBM Technical Disclosure Bulletin,* vol. 35, No. 2, Jul. 1992 pp. 335–336, "Graphical User Interface for the Distributed System Namespace".
*IBM Technical Disclosure Bulletin,* V34, No. 8, Jan. 1992, pp. 386–388, "Dynamic Icon Navigation to Nested Containers".

*Primary Examiner*—Xiao Wu
*Attorney, Agent, or Firm*—Gregory M. Doudnikoff

[57] ABSTRACT

A method and system for efficiently presenting the contents of a container object within a graphical user interface on a display in a data processing system. The graphical user interface includes an existing display window area. A container object, which may be utilized as a graphical indication of the storage of multiple objects, is selected. An organized format for presenting contents of the specified container object is specified by a user. The contents of the selected container object are then presented in the specified organized format within the existing display window area in the graphical user interface on the display, without allocating an additional display window area.

18 Claims, 8 Drawing Sheets

METHOD AND SYSTEM FOR PRESENTING CONTENTS OF A CONTAINER OBJECT WITHIN A GRAPHICAL USER INTERFACE IN A DATA PROCESSING SYSTEM

This is a continuation of application Ser. No. 08/113,557 filed Aug. 27, 1993, now abandoned.

BACKGROUND OF THE INVENTION

1. Technical Field

The present invention relates in general to an improved graphical user interface in a data processing system and in particular to a method and system for efficiently presenting contents of a container object within a graphical user interface in a data processing system. Still more particularly, the present invention relates to a method and system for efficiently presenting contents of a container object in an organized format within an existing display window area within a graphical user interface in a data processing system.

2. Description of the Related Art

Data processing systems commonly utilize graphical user interfaces to enable users to interact with the data processing system and manipulate the activities and functions available to the users. Users may select, through the graphical user interface, to perform a particular activity utilizing input devices such as a keyboard or a "mouse." In a graphical user interface, activities such as "print document" or "select a document" may be represented to the user in the form of function keys graphically displayed on the computer display screen and selected by striking a particular key on the keyboard, or as icons to be selected utilizing a graphical pointing device such as a "mouse." A pointer, or mouse cursor, on the display screen is typically utilized to represent the current location of the "mouse." By moving the "mouse," a user may move the pointer, or mouse cursor, around within the computer display screen. An object may be graphically represented to a user as an "icon" utilizing the graphical user interface. An object is an item which may be manipulated as a unit. Objects may be of three types: device, data, and container. A device object may be manipulated to perform a selected task such as typically performed utilizing a physical or logical device such as a printer, mouse, or facsimile machine. For example, a "printer" device object may be manipulated to print documents or text. Data objects may include documents or text, such as created utilizing word processing applications. Container objects are typically objects into which other objects may be stored. Therefore, objects may be stored together in a container object and manipulated as a unit by manipulating the container object.

Container objects, commonly called "folders," are typically provided as part of a graphical user interface. These "folders" may be conically represented as a traditional filing folder and may be utilized to group, or "store," other objects in a way which is meaningful to a user. Such "folders" typically require a user to perform some action in order to select, locate and "store" objects within the "folder." Some known container objects may also be manipulated to perform user specified activities utilizing the objects stored within the container object. For example, a user may specify that all objects stored within selected container object be printed.

A graphical user interface may display multiple icons which represent objects. These icons may be displayed in any order throughout the graphical user interface. Often these icons are displayed randomly throughout the graphical user interface. Windows are typically used to indicate a group of related objects.

A window is an area of the graphical user interface with visible boundaries within which information is displayed. Windows typically include a border completely surrounding the window, a status line indicating the name of the window or application being displayed in the window, various buttons to be utilized to maximize or minimize the size of the window, and pull-down menus which may be accessed by selecting a display element. Windows also typically appear in a color or shade different from the color or shade of the background of the graphical user interface in order to help distinguish the window from the rest of the graphical user interface.

When a container object is selected and opened by a user, the contents of the container object are typically displayed within a window. In this manner, a user may distinguish the contents of the selected container object from other objects that might be currently displayed within the graphical user interface.

It frequently becomes necessary to select and display the contents of multiple container objects simultaneously. To do this, multiple windows are created, each displaying the contents of one of the selected container objects. Due to the limited size of a computer display device, such as a display screen, in order to display multiple windows, the windows must overlap. When one window overlaps another, the contents of the underlying window are typically obscured. Therefore, in known systems, when many windows are displayed at one time, each window obscures a portion of another window's contents.

It should therefore be apparent that a need exists for a method and system for presenting contents of a container object in an organized format within an existing display window area within a graphical user interface in a data processing system.

SUMMARY OF THE INVENTION

It is therefore one objective of the present invention to provide an improved graphical user interface in a data processing system.

It is another objective of the present invention to provide an improved method and system for efficiently presenting the contents of a container object within a graphical user interface within a data processing system.

It is yet another objective of the present invention to provide an improved method and system for efficiently presenting the contents of a container object in an organized format within an existing display window area within a graphical user interface within a data processing system.

The foregoing objectives are achieved as is now described. A method and system are disclosed for efficiently presenting the contents of a container object within a graphical user interface on a display in a data processing system. The graphical user interface includes an existing display window area. A container object, which may be utilized as a graphical indication of the storage of multiple objects, is selected. An organized format for presenting contents of the specified container object is specified by the user. The contents of the selected container object are then presented in the specified organized format within the existing display window area within the graphical user interface on the display, without allocating an additional display window area.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
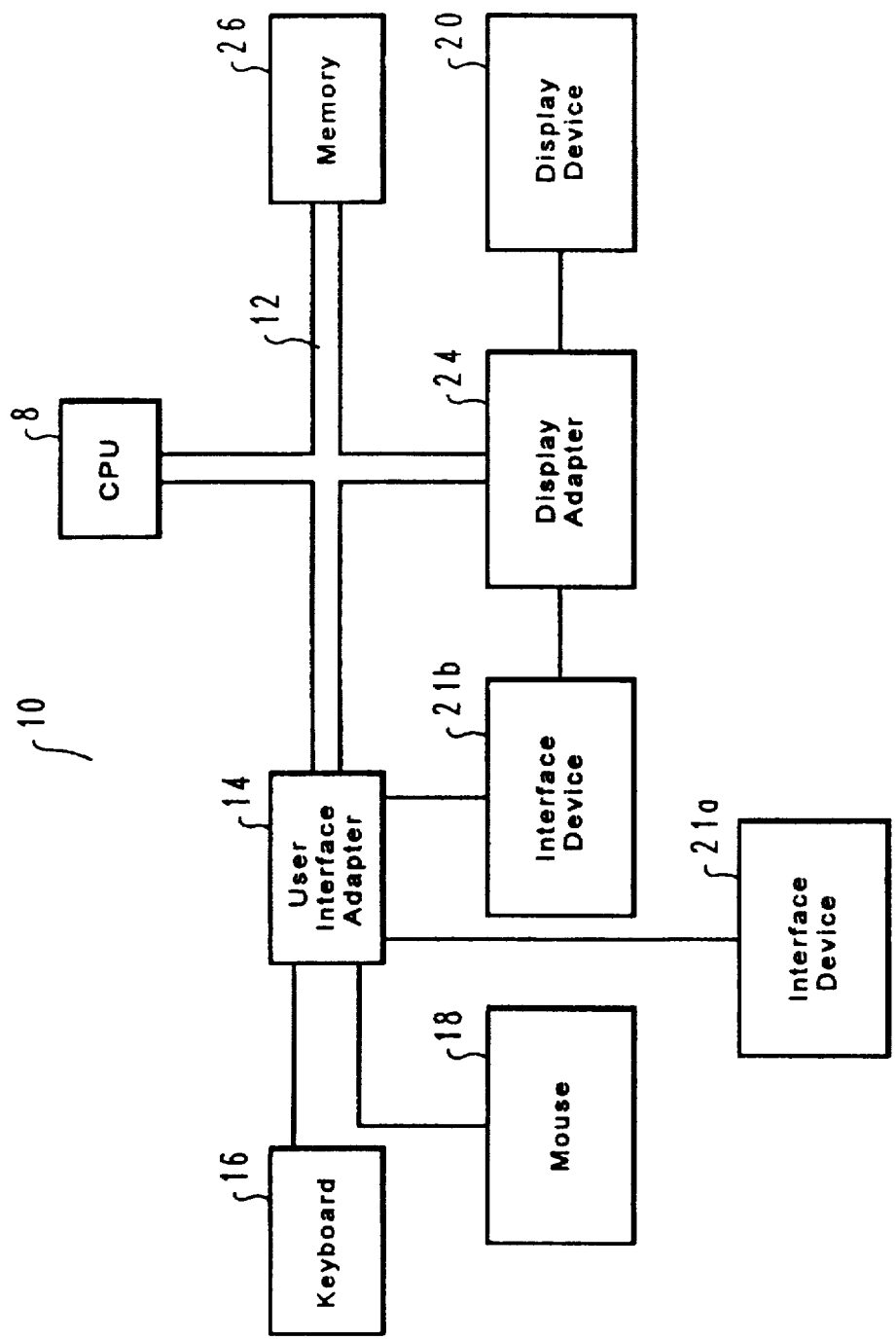
FIG. 1 depicts a pictorial representation of a data processing system which may be utilized to implement the method and system of the present invention.

An embodiment of the present invention will now be described with initial reference to FIG. 1, which illustrates a representative data processing system 10 in which the present invention may be practiced. Data processing system 10 includes a central processing unit (CPU) 8, which may be the processor of a host computer or the microprocessor of a work station or personal computer or the like. In any case, known means, such as a bus 12, are employed to connect the CPU 8 to one or more interface devices, such as keyboard 16, a mouse 18, and/or other interface devices 21a and 21b, which can be any user interface device, such as a touch sensitive screen, a digitized pen entry pad, etc. A display device 20, such as an LCD screen or CRT screen, is connected to CPU 8 via a display adapter 24. CPU 8 is also connected to memory 26, which can include ROM, RAM, etc. In a preferred embodiment of the present invention, CPU 8 is suitably programmed to implement the logic flow charts of FIGS. 3A, 3B, 3C and 3D in order to provide a presentation of contents of a container object in an organized format in an existing display window area in a graphical user interface.

As those skilled in the art are well aware, a graphical user interface environment for a data processing system is implemented with computer readable code, also known as software. The logic flow charts of FIGS. 3A, 3B, 3C and 3D describe the logical steps carried out by software implementing the present invention. Software program code, which employs the present invention, is typically stored in the memory of a standalone workstation environment. The software program code may be embodied on any of a variety of known media for use with the data processing system, such as a diskette or CD-ROM. The program code may be distributed on such media, or may be distributed to users from the memory of one computer system over a network of some type to other computer systems for use by users of such other systems. Such techniques and methods for embodying the software code on media and/or distributing software code are well known, and will not be further discussed herein.

Figure 2A:
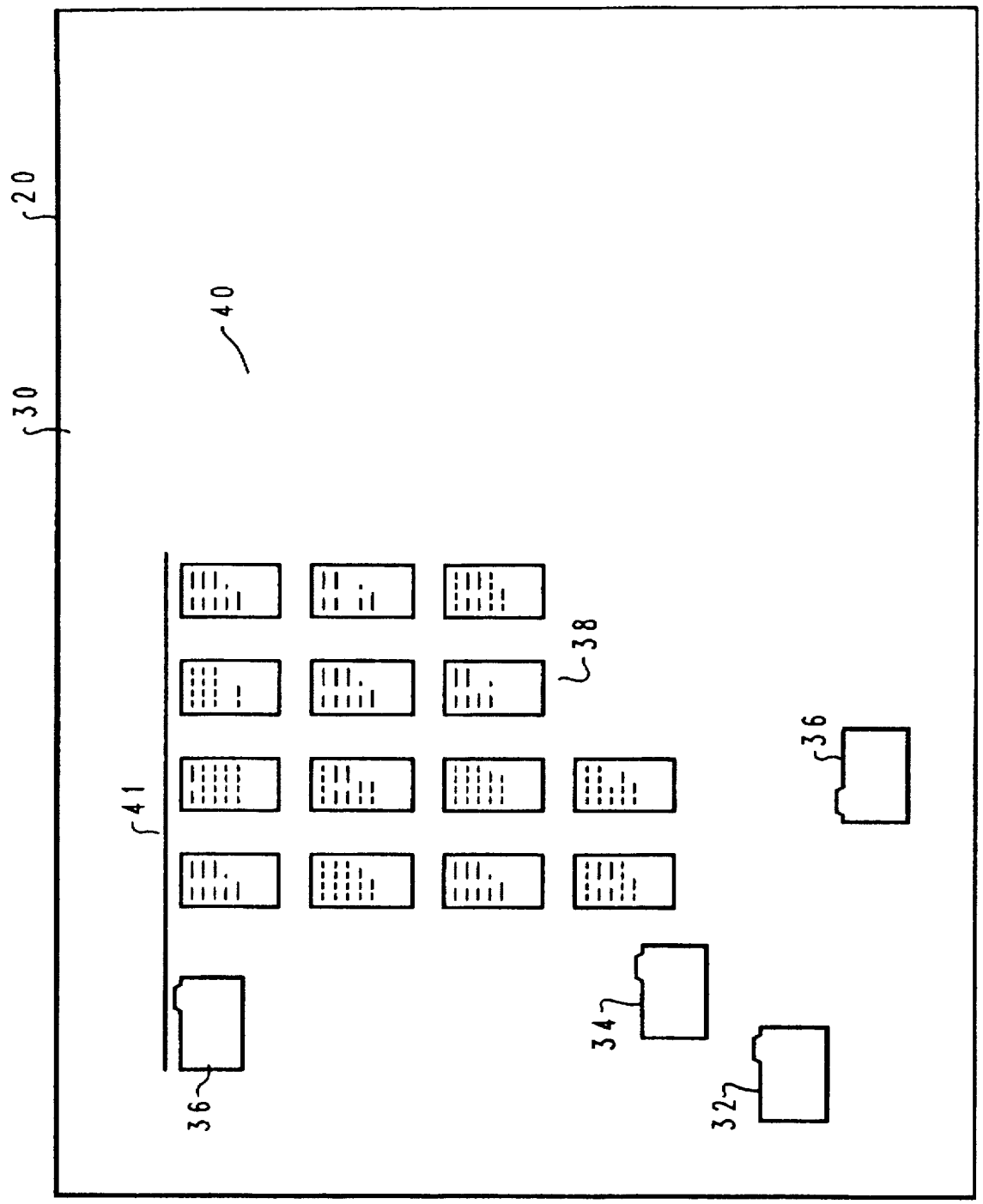
FIGS. 2A, 2B and 2C illustrate a pictorial representation of a graphical user interface including contents of container objects presented in an organized format in an existing display window area within the graphical user interface in accordance with the present invention.
Figure 2B:
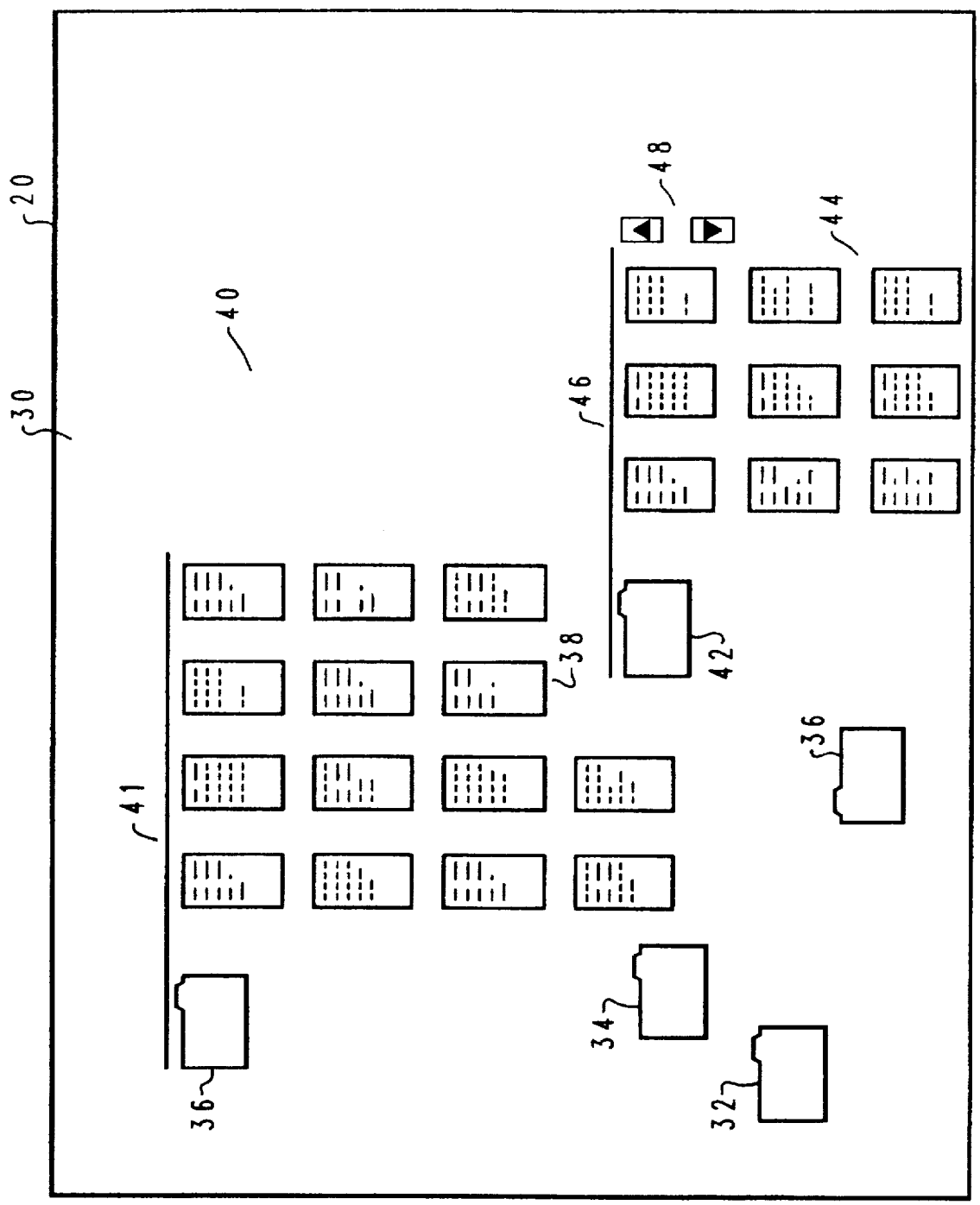
Figure 2C:
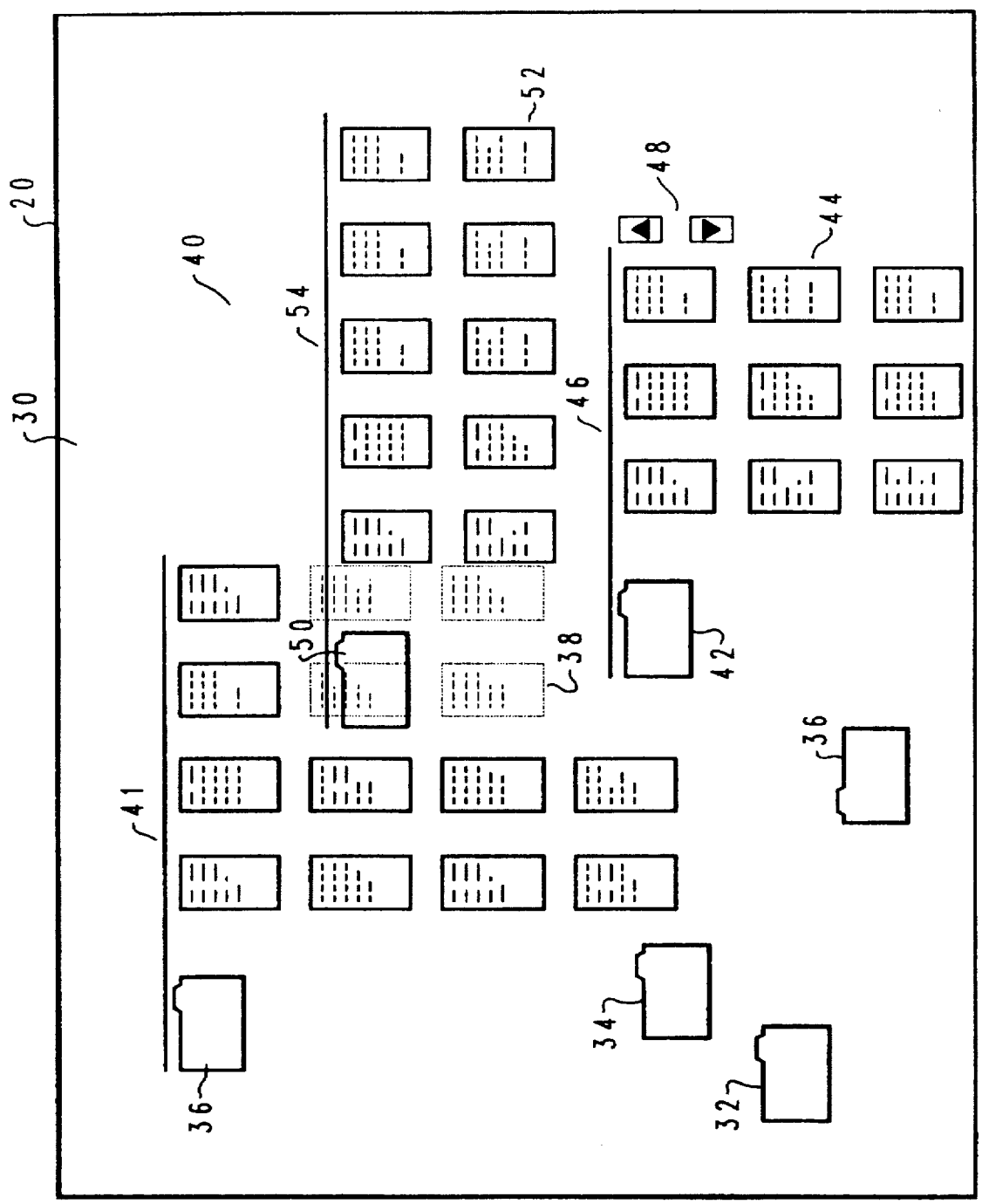
Figure 3A:
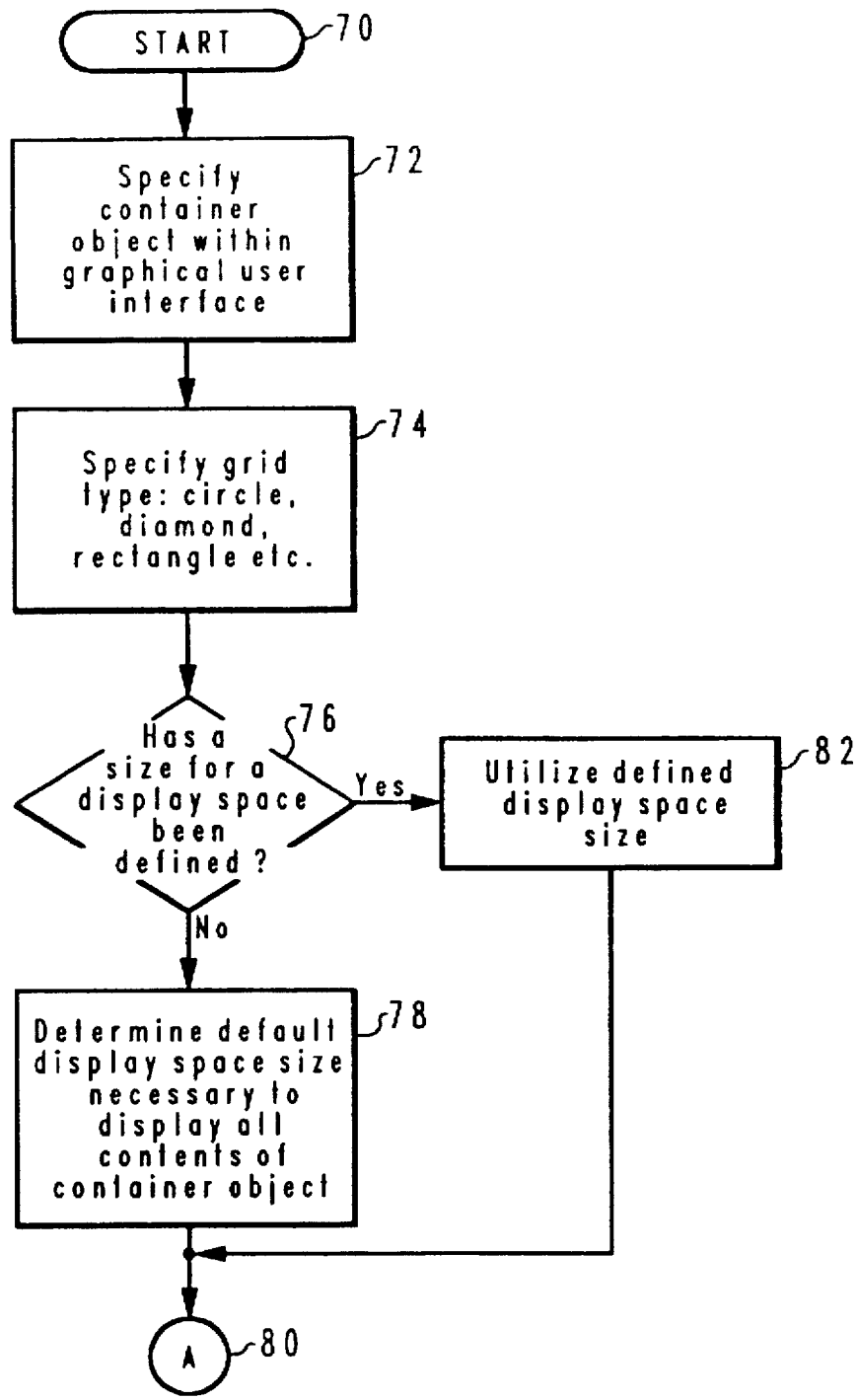
FIGS. 3A, 3B, 3C and 3D together form a high level flow chart depicting a presentation of contents of a container object in an organized format in an existing display window area within a graphical user interface in accordance with the present invention.
Figure 3B:
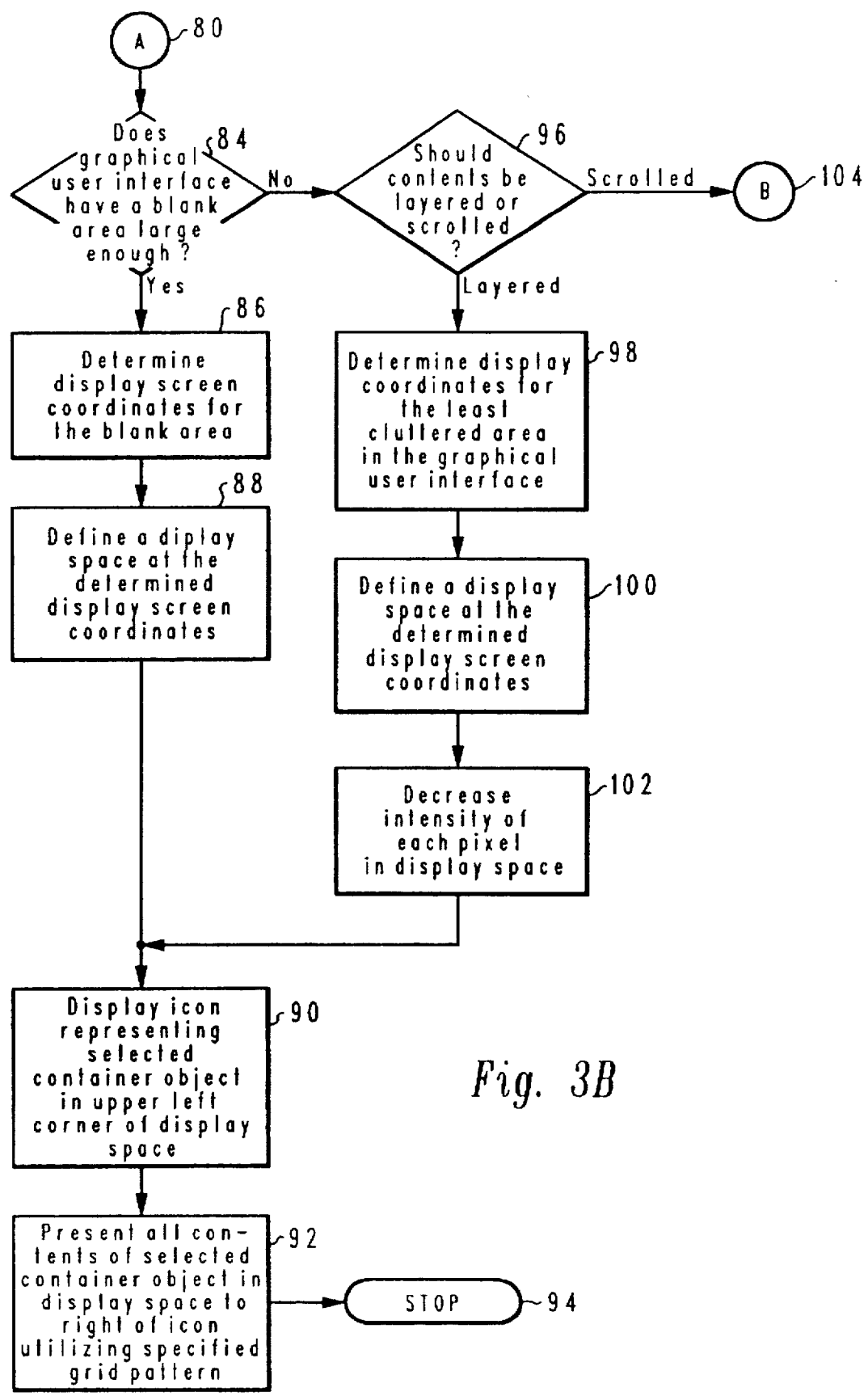
Figure 3C:
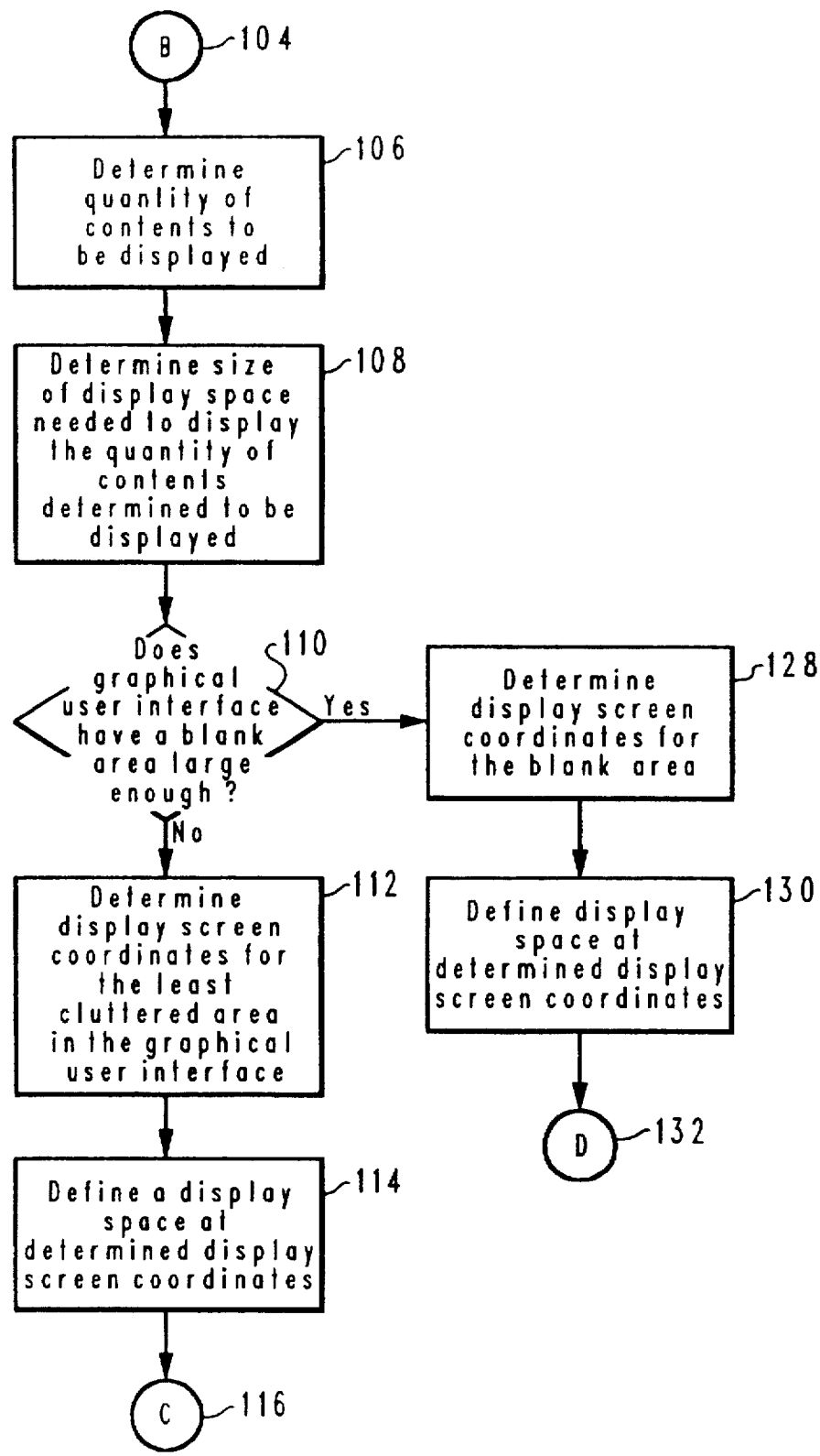
Figure 3D:
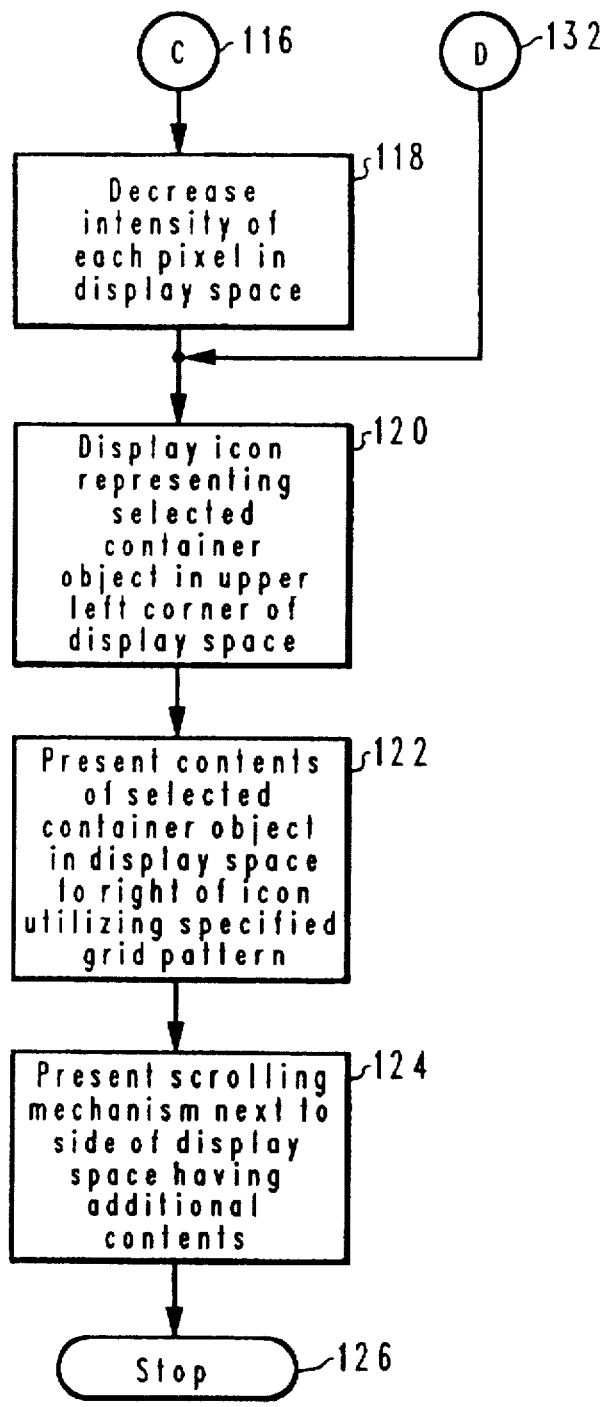

FIGS. 2A, 2B and 2C depict a pictorial representation of a graphical user interface 30 including contents of container objects presented in an organized format in an existing display window area within graphical user interface 30 in accordance with the present invention. FIG. 2A depicts contents 38 of a container object 36 and objects 32, 34, and 36 displayed within graphical user interface 30 in an existing display window area 40, without allocation of an additional display window area. Contents 38 of container object 36 are displayed in display space 41 within existing display window area 40. The contents 38 of a container object 36 are displayed within graphical user interface 30 utilizing an organized format such as a square grid pattern. Contents 38 may comprise a plurality of data objects, such as documents. Those skilled in the art will recognize that any organized format may be utilized to display the contents, such as a circle, rectangle, or diamond grid.

In this manner, contents 38 are displayed to a user without utilizing a traditional window, thus reducing the visual clutter associated with windows such as a title bar, menu bar, and a border. The contents of a container object are grouped together in an organized format so that a user may distinguish the contents from other objects displayed in the graphical user interface. The organized format enables the user to make this distinction without the need for a window.

FIG. 2B illustrates contents 38 of container object 36 and contents 44 of container object 42 all displayed in existing display window area 40, without allocation of an additional display window area within graphical user interface 30. Contents 44 are displayed in a square grid format in a display space 46. Additional contents of container object 44 may be shown by utilizing a scrolling mechanism such as scrolling buttons 48. A scrolling mechanism is necessary because there was not a large enough blank area within graphical user interface 30 to display all of the contents of container object 42 at one time.

FIG. 2C depicts contents 38 of container object 36, contents 44 of container object 42, and contents 52 of container object 50 all displayed in existing display window area 40 within graphical user interface 30 without the allocation of additional display window areas. Since there was not a blank area within graphical user interface 30 large enough to display all of contents 52, contents 52 are displayed in a display space 54 in the least cluttered area of graphical user interface 30. Contents 52 overlie contents 38.

FIGS. 3A, 3B, 3C and 3D together form a high level flow chart depicting a presentation of contents of a container object in an existing display window area within a graphical user interface in accordance with the present invention. The process starts as depicted as block 70 and thereafter passes to block 72 which illustrates the specification of a container object within a graphical user interface. Next, block 74 depicts the specification of a grid type such as a circle diamond or rectangle to be used when displaying the contents of the specified container object. The process then passes to block 76 which illustrates a determination of whether or not a size for a display space has been defined. Contents of a contained object may be displayed in a display space, having a user defined size, or may be displayed in a display space utilizing a default size. If a determination is made that a size for a display space has not been defined, the process passes to block 78 which depicts the determination of a default size for the display space. The default size is the size necessary to display all contents of the specified container object. Therefore, when a default size is utilized, there is no need to maximize or minimize a display space size. The process thereafter passes to block 84 as illustrated through block 80.

Referring again to block 76, if a determination is made that a size for a display space has been defined, the process passes to block 82 which illustrates the utilization of the defined display space size. The process then passes to block 84 as depicted through block 80. Block 84 illustrates a determination of whether or not the graphical user interface has a blank area large enough to accommodate the size of the display space. If a determination is made that the graphical user interface has a large enough blank area, the process passes to block 86 which illustrates a determination of the display screen coordinates for the blank area. Next, the process passes to block 88 which depicts a definition of a display space at the determined display screen coordinates.

Block 90 illustrates the displaying of an icon representing the selected container object in the upper left corner of the display space. Thereafter, the process passes to block 92 which illustrates the presentation of all contents of the selected container object in the display space to the right of the icon utilizing the specified grid pattern. The process then terminates as depicted at block 94.

Referring now to block 84, if a determination is made that the graphical user interface does not have a large enough blank area, the process passes to block 96 which illustrates a determination of whether or not the contents should be layered or scrolled. If a determination is made that the contents should be layered, the process passes to block 98 which depicts the determination of display coordinates for the least cluttered area in the graphical user interface. Next, the process passes to block 100 which illustrates a definition of a display space at the determined display screen coordinates. The process then passes to block 102 which illustrates the decreasing of the intensity of each pixel in the display space. The process then again passes to block 90.

Referring again to block 96, if a determination is made that the contents should be scrolled, the process passes to block 106 as depicted through block 104. Block 106 illustrates the determination of the quantity of contents to be displayed. Next, the process passes to block 108 which illustrates a determination of a size of a display space needed to display the quantity of contents determined to be displayed. Thereafter, the process passes to block 110 which illustrates a determination of whether or not the graphical user interface has a blank area large enough to display the determined size of the display space. If a determination is made that the graphical user interface does not have a blank area large enough to display the size of the display space, the process passes to block 112 which depicts a determination of display screen coordinates for the least cluttered area in the graphical user interface. Thereafter, the process passes to block 114 which depicts a definition of a display space at the determined display screen coordinates. The process then passes to block 118 as depicted through block 116.

Block 118 illustrates the decreasing of the intensity of each pixel in the display space. Next, block 120 depicts the displaying of an icon representing the selected container object in the upper left corner of the display space. Block 122 then illustrates the presentation of the contents of the selected container object in the display space to the right of the icon utilizing a specified grid pattern. The process then passes to block 124 which depicts the presentation of a scrolling mechanism such as a scroll bar next to the side of the display space having additional contents. The process then terminates as depicted at block 126.

Referring again to block 110, if a determination is made that the graphical user interface has a large enough blank area, the process passes to block 128 which illustrates the determination of display screen coordinates for the blank area. Next, the process passes to block 130 which depicts the definition of a display space at the determined display screen coordinates. Thereafter, the process passes to block 120 as illustrated through block 132.

While the invention has been particularly shown and described with reference to a preferred embodiment, it will be understood by those skilled in the art that various changes in form and detail may be made therein without departing from the spirit and scope of the invention.

What is claimed is:

1. Computer readable code for presenting contents of a container object within a graphical user interface without creating a window, comprising:

first subprocesses for permitting a user to specify a container object for which the user desires contents to be displayed;

second subprocesses for specifying an organized format in which the contents are to be displayed;

third subprocesses for determining a display space size for displaying the contents of the container object;

fourth subprocesses for determining whether the graphical user interface has a blank area large enough to display an element having the display space size; and fifth subprocesses for displaying only the container object and the contents in the organized format in the blank area if said fourth subprocesses determine that the graphical user interface has a blank area large enough.

2. Computer readable code for presenting contents of a container object within a graphical user interface without creating a window according to claim 1, further comprising:

sixth subprocesses for determining an area of the graphical user interface having minimal clutter if said fourth subprocesses determine that the graphical user interface does not have a blank area large enough;

seventh subprocesses for decreasing pixel intensity in the minimal clutter area; and eighth subprocesses for displaying the container object and the contents in the organized format in the minimal clutter area.

3. Computer readable code for presenting contents of a container object within a graphical user interface without creating a window according to claim 1, further comprising:

ninth subprocesses for determining a quantity of the contents associated with the container object if said fourth subprocesses determine that the graphical user interface does not have a blank area large enough;

tenth subprocesses for determining whether the graphical user interface has a second blank area large enough to display a portion of the contents; and eleventh subprocesses for displaying a portion of the contents in the organized format and a user manipulable scroll bar to permit the user to access all of the contents by scrolling in the second blank area.

4. Computer readable code for presenting contents of a container object within a graphical user interface without creating a window according to claim 3, further comprising:

twelfth subprocesses for determining an area of the graphical user interface having minimal clutter if said tenth subprocesses determine that the graphical user interface does not have a second blank area large enough to display a portion of the contents;

thirteenth subprocesses for decreasing pixel intensity in the minimal clutter area; and fourteenth subprocesses for displaying the portion of the contents in the organized format and a user manipulable scroll bar to permit the user to access all the contents by scrolling in the minimal clutter area.

5. Computer readable code for presenting contents of a container object within a graphical user interface without creating a window according to claim 1, wherein said third subprocesses further permits the user to define the display space size for displaying the contents of the container object.

6. Computer readable code for presenting contents of a container object within a graphical user interface without creating a window according to claim 5, wherein said third subprocesses determine a default size for the display space size if the user does not define the display space size.

7. A method in a computing environment for presenting contents of a container object within a graphical user interface, comprising the steps of:

(a) permitting a user to specify a container object for which the user desires contents to be displayed;

(b) specifying an organized format in which the contents are to be displayed;

(c) determining a display space size for displaying the contents of the container object;

(d) determining whether the graphical user interface has a blank area large enough to display an element having the display space size; and (e) displaying only the container object and the contents in the organized format in the blank area if said step (d) determines that the graphical user interface has a blank area large enough.

8. A method for presenting contents of a container object within a graphical user interface according to claim 7, further comprising the steps of:

(f) determining an area of the graphical user interface having minimal clutter if said step (d) determines that the graphical user interface does not have a blank area large enough;

(g) decreasing pixel intensity in the minimal clutter area; and (h) displaying the container object and the contents in the organized format in the minimal clutter area.

9. A method for presenting contents of a container object within a graphical user interface according to claim 7, further comprising the steps of:

(i) determining a quantity of the contents associated with the container object if said step (d) determines that the graphical user interface does not have a blank area large enough;

(j) determining whether the graphical user interface has a second blank area large enough to display a portion of the contents; and (k) displaying a portion of the contents in the organized format and a user manipulable scroll bar to permit the user to access all of the contents by scrolling the second blank area.

10. A method for presenting contents of a container object within a graphical user interface according to claim 9, further comprising the steps of:

(l) determining an area of the graphical user interface having minimal clutter if said step (j) determines that the graphical user interface does not have a second blank area large enough to display a portion of the contents;

(m) decreasing pixel intensity in the minimal clutter area; and (n) displaying the portion of the contents in the organized format and a user manipulable scroll bar to permit the user to access all the contents by scrolling in the minimal clutter area.

11. A method for presenting contents of a container object within a graphical user interface according to claim 7, wherein said step (c) further permits the user to define the display space size for displaying the contents of the container object.

12. A method for presenting contents of a container object within a graphical user interface according to claim 11, wherein said step (c) further determines a default size for the display space size if the user does not define the display space size.

13. A system in a computing environment for presenting contents of a container object within a graphical user interface without creating a window, comprising:

first means for permitting a user to specify a container object for which the user desires contents to be displayed;

second means for specifying an organized format in which the contents are to be displayed;

third means for determining a display space size for displaying the contents of the container object;

fourth means for determining whether the graphical user interface has a blank area large enough to display an element having the display space size; and fifth means for displaying only the container object and the contents in the organized format in the blank area if said fourth means determines that the graphical user interface has a blank area large enough.

14. A system in a computing environment for presenting contents of a container object within a graphical user interface without creating a window according to claim 13, further comprising:

sixth means for determining an area of the graphical user interface having minimal clutter if said fourth said means determines that the graphical user interface does not have a blank area large enough;

seventh means for decreasing pixel intensity in the minimal clutter area; and eighth means for displaying the container object and the contents in the organized format in the minimal clutter area.

15. A system in a computing environment for presenting contents of a container object within a graphical user interface without creating a window according to claim 13, further comprising:

ninth means for determining a quantity of the contents associated with the container object if said fourth means determines that the graphical user interface does not have a blank area large enough;

tenth means for determining whether the graphical user interface has a second blank area large enough to display a portion of the contents; and eleventh means for displaying a portion of the contents in the organized format and a user manipulable scroll bar to permit the user to access all of the contents by scrolling in the second blank area.

16. A system in a computing environment for presenting contents of a container object within a graphical user interface without creating a window according to claim 15, further comprising:

twelfth means for determining an area of the graphical user interface having minimal clutter if said tenth said means determines that the graphical user interface does not have a second blank area large enough to display a portion of the contents;

thirteenth means for decreasing pixel intensity in minimal clutter area; and fourteenth means for displaying the portion of the contents in the organized format and a user manipulable scroll bar to permit the user to access all of the contents by scrolling in the minimal clutter area.

17. A system in a computing environment for presenting contents of a container object within a graphical user interface without creating a window according to claim 13, wherein said third means permits the user to define the display space size for displaying the contents of the container object.

18. A system in a computing environment for presenting contents of a container object within a graphical user interface without creating a window according to claim 17, wherein said third means determines a default size for the display space size if the user does not define the display space size.

* * * * *